United States Patent [19]

D'Addio et al.

[11] Patent Number: 4,742,353

[45] Date of Patent: May 3, 1988

[54] DIGITAL PROCESSOR FOR RADAR SIGNALS WHICH CAN PERFORM ADAPTIVE SUPPRESSION OF CLUTTER MEANS OF A PARAMETRIC ESTIMATOR

[75] Inventors: Egidio D'Addio, Naples; Alfonso Farina, Rome, both of Italy

[73] Assignee: Selenia Industrie Elettroniche Associate S.p.A., Rome, Italy

[21] Appl. No.: 39,751

[22] PCT Filed: Jul. 3, 1985

[86] PCT No.: PCT/IT85/00013

§ 371 Date: May 27, 1986

§ 102(e) Date: May 27, 1986

[87] PCT Pub. No.: WO86/01001

PCT Pub. Date: Feb. 13, 1986

Related U.S. Application Data

[63] Continuation of Ser. No. 865,739, May 27, 1986.

[30] Foreign Application Priority Data

Jul. 27, 1984 [IT] Italy .............................. 48644 A/84

[51] Int. Cl.⁴ .............................................. G01S 13/86
[52] U.S. Cl. .................................... 342/159; 342/195; 364/724
[58] Field of Search ....................... 342/93, 159–162, 342/195; 364/724

[56] References Cited

U.S. PATENT DOCUMENTS

| | | | |
|---|---|---|---|
| 3,872,290 | 3/1975 | Crooke et al. | 364/724 |
| 4,217,584 | 8/1980 | Lombardi et al. | 343/7.7 |
| 4,377,793 | 3/1983 | Horna | 364/724 X |
| 4,578,676 | 3/1986 | Harrison, Jr. | 343/5 N Q X |
| 4,584,659 | 4/1986 | Stikvoort | 364/724 |

FOREIGN PATENT DOCUMENTS

| | | | |
|---|---|---|---|
| 3243606 | 5/1984 | Fed. Rep. of Germany | 307/270 |
| 2410286 | 6/1979 | France | 501/30 |

OTHER PUBLICATIONS

V. Bühring et al., "Ein Adaptives Filter zur Unterdrückung von Radarstörungen mit Unbekanntem Spektrum"; Frequenz, (vol. 30, #9, 1976; pp. 238–243).

V. Hansen et al., "A Comparison of the Performance Against Clutter of Optimum, Pulsed Doppler and MTI Processors"; IEEE Internt'l Radar Conf. Record (1980), pp. 211–218.

Primary Examiner—Theodore M. Blum
Assistant Examiner—Bernarr Gregory
Attorney, Agent, or Firm—Stiefel, Gross & Kurland

[57] ABSTRACT

A digital processor for radar signals which can perform adaptive suppression of the disturbance clutter and enhancement of the useful signal of given Doppler frequency. It can approximate the principle of operation of the optimum processor, which is that processor which maximizes the signal-to-noise ratio. Such processor can also cancel, in a adaptive manner, a clutter component having an approximately Gaussian power spectrum.

3 Claims, 7 Drawing Sheets

DIGITAL PROCESSOR FOR RADAR SIGNALS WHICH CAN PERFORM ADAPTIVE SUPPRESSION OF CLUTTER MEANS OF A PARAMETRIC ESTIMATOR

This is a continuation of U.S. application Ser. No. 865,739, filed May 27, 1986.

BACKGROUND OF THE INVENTION

The present invention relates to a radar signal digital processor which can suppress clutter disturbances and enhance useful signals of given Doppler frequency. It can approximate the principle of operation of the optimum processor, which is the processor which maximizes the signal-to-noise ratio. It is furthermore capable of suppressing, in an adaptive way, clutter having an approximatively Gaussian power spectrum. Its performance is better than that of an adaptive moving target indicator MTI (MTIA) followed by a coherent integrator.

The invention presented herein relates to the field of radars, and more exactly that of radar signal processing for disturbance suppression. The device may be inserted within an integrated radar signal digital processor, between the analogue-to-digital converter and the modulus extractor. The specific tasks of the device (disturbance suppression and useful signal enhancement), are obtained in an adaptive manner as far as disturbance and useful signal to be detected (parameter variations) are concerned.

This adaptiveness provides a way to overcome the limitations related to fixed disturbance filtering, while optimizing, at the same time, system capability to detect useful targets. Signal processors, which are presently implemented by means of digital circuitry, receive at their input the radar video signal which is detected coherently and coverted into digital format. They provide as an output an indication of targets which may be present (detection process) by attenuating undesirable signals. The elimination of undesirable signals arising out of reflections caused by natural or artificial obstacles (clutter), is obtained in current radar technique by means of MTI filtering (Moving Target Indicator) described in many articles and books, among them:

[1] M. I. Skolnik: "Introduction to Radar Systems" 2nd Edition, Mc Graw Hill, New York; 1980;

[2] D. C. Schleher "MTI Radar", Artech House 1978.

In current practice, it is customary to resort to a more flexible type of filtering than the one above, which is that of 1st and 2nd generation MTD, described in Chapter 4.7 of Skolnik's book and in many other works, among them:

[3] C. E. Muehe: "Moving Target Detector, An Improved Signal Processor", AGARD Conf. Proceedings No. 195, June 14–17, 1976, pp. 14-1 to 14-10;

[4] R. M. O'Donnel—C. E. Muehe: "Automated Tracking For Aircraft Surveillance Radar Systems"—IEE Trans., Vol. AES 15, No. July 1979, pp. 508–516;

[5] D. Karp—J. R. Anderson: "MTD-II Summary Report" MIT—Lincoln Lab. ATC 95, June 1, 1981;

[6] J. R. Anderson—D. Karp: "Evaluation of the MTD in High Clutter Environment". IEEE Int. Radar Conf., 1980, pp. 219–224;

[7] J. W. Taylor: "Sacrifices in Radar Clutter Suppression.

The technological improvements achieved of recent years have given way to the development of devices having an improved adaptivity. An example of this is the A-MTD processor, such as that described in:

[8] E. D'Addio, G. Galati, E. Giaccari Selenia S.p.A.: "Digital A-MTD Processor for Search Radars having a set of Doppler filters and a threshold system selectable upon type of disturbance, Italian patent No. 48701/A/83, where the task is that of selecting one of three filter shapes, each of which is designed for a given level of the disturbance to be suppressed, as a function of the measured clutter level.

A further example in this area can be found in the adaptive MTI device:

[9] G. Galati, P. Lombardi "Design & Evaluation of an Adaptive MTI filter," IEEE Trans. on AES Vol. 14 No. 6 Nov. 1978.

This latter device implements the function of a normal MTI filter over clutter disturbance caused by moving obstacles by means of an estimate of the disturbance Doppler phase.

The limits, in performance terms, of the processors mentioned above are as follows:

1. The fixed type of filtering, because pre-designed to cater to a specific disturbance situation, degrades performance obtainable in an environment which has different disturbance characteristics.

2. The degree of freedom, typically the number of processed pulses, are not exploited effectively in the partitioning of pulses between disturbance suppression and useful signal integration.

3. The adaptive type of filtering, mentioned above, gives way to only a partial adaptation to the unknown characteristics of the disturbance. In one case we adapt to its power level, in another we adapt to its average Doppler frequency. In both cases there is no adaptation to the shape of the disturbance power spectrum.

SUMMARY OF THE INVENTION

The limitations discussed above are overcome by the present invention, as explained in the following.

The filter profile is automatically shaped by the device exploiting three different types of information:
clutter correlation coefficient related to the Gaussian power density spectrum;
clutter average Doppler frequency;
Doppler frequency of useful signal to be detected The first two items are automatically computed by the device through a phase estimator and correlation which will be presented in the following. The third item is provided to the device's input and is meant to set the finite impulse response (FIR) filter further downstream so that it enhances the Doppler frequency band in which we expect to receive the useful signal.

Based on this information, the filter is shaped so as to attenuate the frequency bands in which clutter is present and to enhance that in which the useful signal is expected.

The method, which is adapted to synthesize the FIR filter weights and therefore its frequency response, is such as to guarantee the utmost exploitation of the pulses to be processed, both in terms of clutter suppression and of signal integration.

The method which is used to derive the best suited filter profile is based upon the theory of optimum radar signal processing when surrounded by a disturbing environment, which is described in:

[10] L. E. Brennan, I. S. Reed: "Optimum processing of unequally spaced radar pulse trains for clutter rejection". IEEE Trans. on Aerospace and Electronic System, vol. AES—4, No. 3, May 1968 pp. 474–477.

[11] F. Chiuppesi, G. Galati, P. Lombardi: "Optimisation of rejection filters", IEEE Proc., Vol. 127, Pt. F, No. 5, October 1980, pp. 354–359.

[12] V. G. Hansen: "Clutter suppression in search radar" IEEE Conf on Decision and Control, 1977, pp. 536–543.

[13] V. G. Hansen, D. Michelson: "A comparison of performance against clutter of optimum, pulsed doppler and MTI processors". IEEE Int Radar Conference 1980, pp. 211–218.

Reference will now be made to the theory to better illustrate the characteristics of the processing device of the present invention. Let us consider a train of $N_C$ complex samples of the radar echo:

$$X_K = (X_{R,K}, X_{I,K}) K = 1, 2, \ldots, N_C \qquad (1)$$

where $X_{R,K}$ and $X_{I,K}$ are the in-phase and in-quadrature components of the Kth sample at the input.

Samples are separated by T seconds, where T is the radar repetition period. These samples are combined linearly by a FIR filter, with $N_C$ complex coefficients:

$$W_K = (W_{R,K}, W_{I,K}) K = 1, 2, \ldots, N_C \qquad (2)$$

Let us now, for convenience, indicate in vector notation the $N_C$ samples of the received echo and the weights of the linear combination:

$$\underline{X}^T = X_1, X_2, \ldots, X_{NC} \qquad (3)$$

$$\underline{W}^T = W_1, W_2, \ldots, W_{NC}$$

where T indicates the transpose of the vector on which it is applied. The FIR filter (10), performs a linear combination of samples $X_i$, through weights $W_i$ as follows:

$$u = \underline{W}^T \underline{X} \qquad (4)$$

where u is the filter output signal.

The frequency response of the FIR filter depends solely on weights (2), so that we have to act upon them to obtain a given filtering capability. Having indicated with $\underline{M}$ the total disturbance covariance matrix, defined in:

[14] Papoulis "Probability, Random Variables and Stochastic Processes" Boringhieri 1973, the optimum weights provided by the theory, in the case of known Doppler frequency $f_D$ of the useful signal, are:

$$\underline{W} = \underline{M}^{-1} \underline{S}^* \qquad (5)$$

where the asterisk stands for the complex conjugate of the number to which it applies while $\underline{S}$ indicates the set of samples of the expected useful signal. In formulae we have:

$$\underline{S} = S_1, S_2 \ldots S_{NC} \qquad (6)$$

with $$S_K = \exp(j2\pi f_D T) \qquad (7)$$

Through (5) it is possible to adapt weights $\underline{W}$ and therefore filter response, to the disturbance parameters. The greater part of the known clutter disturbances may be modelled by a power density spectrum.

Therefore the generic element (i,k) of matrix $\underline{M}$ has the following expression:

$$M_{i,k} = P_C \rho^{(i-k)^2} \exp\{j(i-k)\phi_c\} + P_N \delta_{ik} \qquad (8)$$

where:
$P_C$ = clutter power
$\rho$ = clutter autocorrelation coefficient
$\phi_c$ = average phase of the clutter
$P_N$ = thermal noise power
$\delta_{ik}$ = Kronecker symbol In the particular case of $\phi_c = 0$, (8) becomes:

$$M_{i,k} = P_C \rho^{(i-k)^2} + P_N \delta_{ik} \qquad (9)$$

When $P_C >> P_N$, which always holds true in practical cases, from (8) and (9) it follows that matrix $\underline{M}$ depends exclusively on $\rho$ and $\phi_c$, less for a non relevant multiplying constant.

Calculation of the inverse matrix $\underline{M}^{-1}$ as required by (5) is an unfeasible operation, in real time, with present technologies.

The invention herein overcomes this problem in the following manner:

Under the assumption that $\phi_c = 0$, the corresponding inverse matrix is a function of the autocorrelation coefficient. If $\phi_c \neq 0$ it is possible to derive $\underline{M}^{-1}(\rho, \phi_c)$ knowing $\underline{M}^{-1}(\rho, 0)$:

$$M^{-1}{}_{i,k}(\rho, \phi_c) = M^{-1}{}_{i,k}(\rho, 0) \cdot \exp\{j(K-i)\phi_c\} \qquad (10)$$

Assuming that the autocorrelation coefficient $\rho$ may take on N distinct values, it is possible to store, once for ever, the elements of $M^{-1}(\rho, 0)$ for each of the N expected values.

By estimating the value of the correlation coefficient of the input signal samples, we may call up from the memory the elements of the corresponding matrix $\underline{M}^{-1}(\rho, 0)$ and derive those of matrix $\underline{M}^{-1}(\rho, \phi_c)$ by estimating $\phi_c$ from the input samples and by applying (10).

This way we can solve the problem of inverting a matrix of $N_C^2$ elements using a memory, which is low cost hardware, and a series of multipliers, as will be shown in the following.

BRIEF DESCRIPTION OF THE DRAWINGS

The present invention will now be described with reference to forms of implementation which are presently preferred and are reported as an illustration on the basis of figures and drawings attached, where.

DETAILED DESCRIPTION OF THE INVENTION

Figure 1:
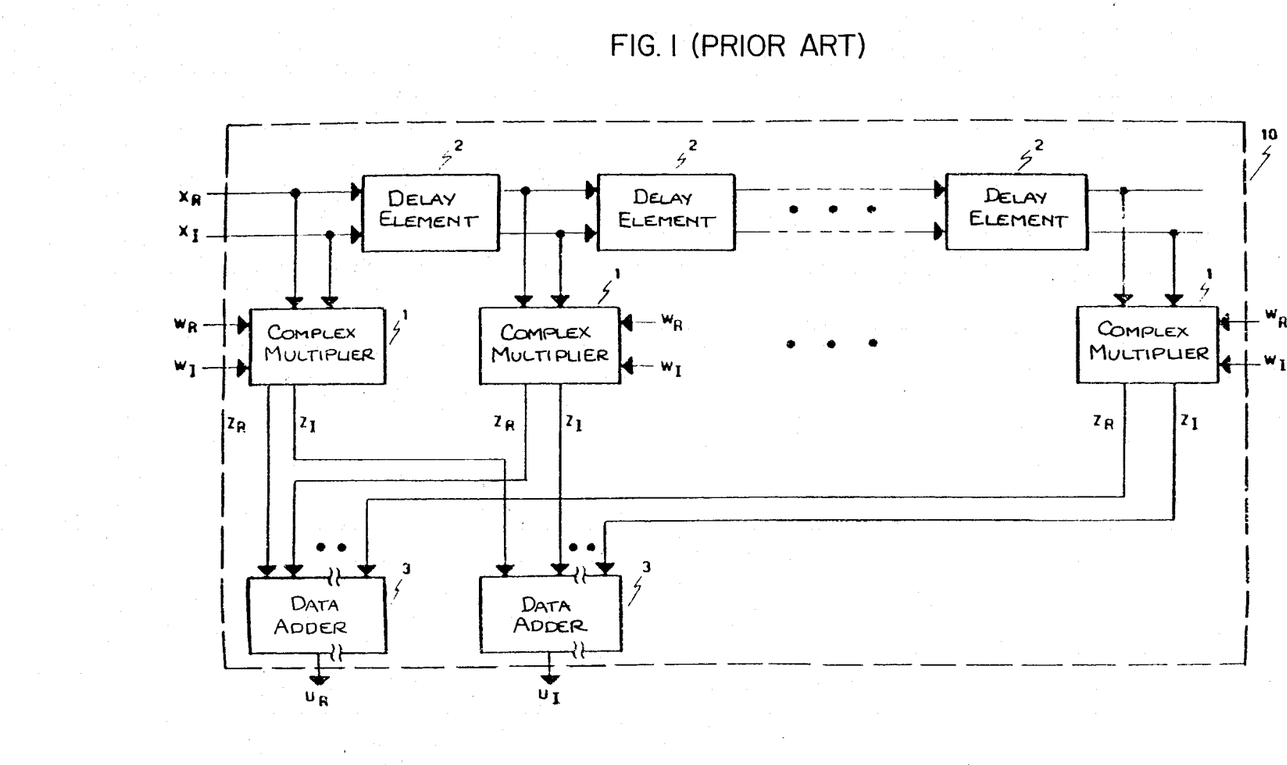
FIG. 1 shows a known FIR filter.

As we have already said, FIG. 1 shows a FIR filter in its most general configuration.

Figure 2:
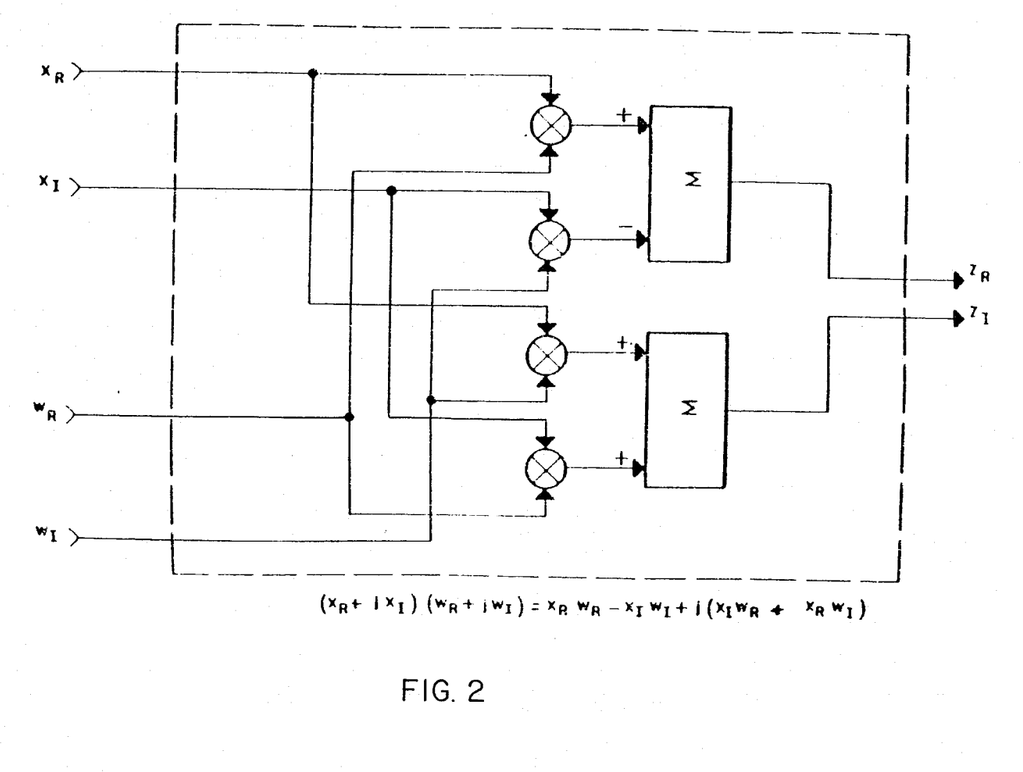
FIG. 2 shows the complex multiplier (block 1 of FIG. 1)

Here the complex multiplier 1, the delay element 2 and the data adder 3 appear at the output of the complex multiplier. For greater clarity, FIG. 2 shows, in a schematic way, the complex multiplier in FIG. 1.

The same FIR filter may also be obtained using a recursive structure; in such case there would be the need for one delay element, one complex multiplier and a storing adder.

Figure 3:
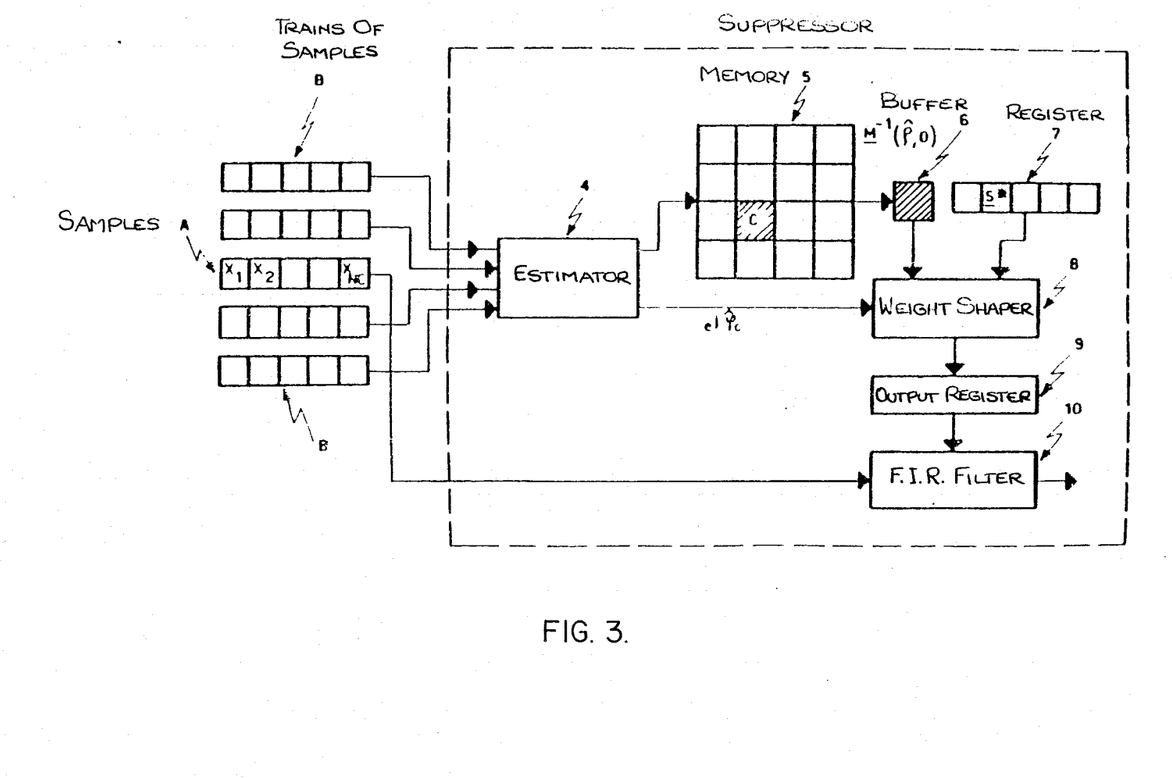
FIG. 3 shows the functional diagram of the suppressor, and is the most significant figure.

FIG. 3 shows, within dotted lines, a functional diagram of the suppressor which is the object of the present invention. Outside the dotted lines, there is the schematic of the memory which contains samples $X_i$ $i=1, 2 \ldots K$ of the signal received, and N similar groups of samples picked up in radar cells at ranges adjacent to the cell relative to the signal received. The train of samples A of the signal received is sent to the input of a FIR filter 10.

A number N of trains B of samples of signals received by the same number of range cells adjacent to the one from which the train to be processed is extracted, is sent to a clutter correlation coefficient and phase $\phi_c$ estimator 4.

In a memory 5 are stored N covariance matrices of clutter having average Doppler frequency equal to zero; N is also the number of distinct values of $\rho$ which the estimator may provide at the output. The estimated value $\hat{\rho}$ of the correlation coefficient selects a precise area C of memory 5, which contains a table, coinciding with $\underline{M}^{-1}(\hat{\rho},0)$ which is dumped into a buffer (6) at the memory output.

In the weight shaper 8 enter $\underline{M}^{-1}(\hat{\rho},0)$, phasor $e^{j\hat{\phi}_c}$ obtained from phase $\hat{\phi}_c$, estimated by block 4 and vector $\underline{S}^*$ stored in register 7. At the output, weights $\underline{W}$ are obtained from block 8 through equations (10) and (5); the weights are then stored in the output register 9, to enter thereafter filter 10 together with the train of samples of the signal A to be processed. To further clarify the operation of the device presented, in the following we shall proceed with a detailed description of the devices which make up the invention.

ESTIMATOR—4 (refer to FIG. 3)

By definition of correlation coefficient 14 we have:

$$\rho = \frac{E\{(x - \bar{x})(y - \bar{y})^*\}}{\sqrt{E\{|x - \bar{x}|^2\} E\{|y - \bar{y}|^2\}}} \tag{11}$$

where the over bar and the letter E stand both for the operation of statistic average; the ($\sim$) sign over letter indicates, on the contrary, that (11) gives way to a complex number; the modulus of which is the correlation coefficient $\rho$, and phase $\phi_c$ coincides with the clutter average Doppler phase. By rewriting (11) we have:

$$\rho = \frac{\overline{xy^*} - \bar{x}\,\bar{y}^*}{\sqrt{(\overline{|x|^2} - |\bar{x}|^2)(\overline{|y|^2} - |\bar{y}|^2)}} \tag{12}$$

The statistic average may be approximated by an arithmetic average over N independent samples taken from N adjacent range cells (see FIG. 3):

$$\rho \approx \frac{\frac{1}{N}\sum_{i=1}^{N} x_i y_i^* - \frac{1}{N^2}\sum_{i=1}^{N} x_i \sum_{i=1}^{N} y_i^*}{\sqrt{\left(\frac{1}{N}\sum_{i=1}^{N}|x_i|^2 - \frac{1}{N^2}\left|\sum_{i=1}^{N} x_i\right|^2\right)\left(\frac{1}{N}\sum_{i=1}^{N}|y_i|^2 - \frac{1}{N^2}\left|\sum_{i=1}^{N} y_i\right|^2\right)}} \tag{13}$$

$$\rho = |\rho| \tag{14}$$

$$\phi_c = \angle \rho \tag{15}$$

Figure 4:
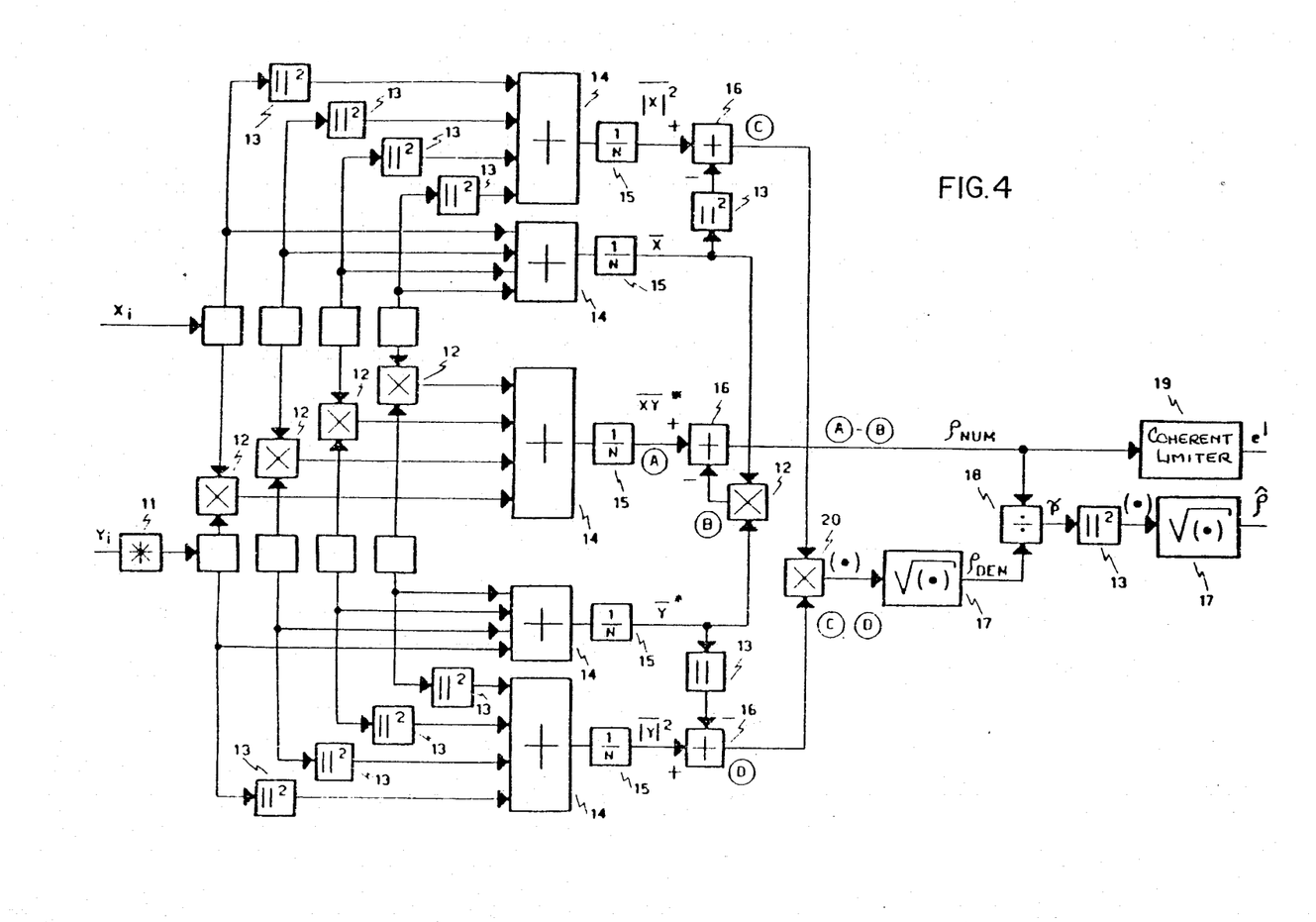
FIG. 4 shows the block diagram of the estimator.

FIG. 4 shows in detail device 4 of FIG. 3 which implements equations (13), (14), (15). In particular one can discern the calculated values:

$$A = \frac{1}{N}\Sigma x_i y_i^*$$

$$B = \frac{1}{N^2}\Sigma x_i \Sigma y_i^*$$

$$C = \frac{1}{N}\Sigma |x_i|^2 - \frac{1}{N^2}|\Sigma x_i|^2$$

$$D = \frac{1}{N}\Sigma |y_i|^2 - \frac{1}{N^2}|\Sigma x_i|^2$$

through which (13) may be rewritten as:

$$\rho \approx \frac{A - B}{\sqrt{C \cdot D}} = \frac{\rho_{NUM}}{\rho_{DEN}} \tag{16}$$

Through a coherent limiter, which divides complex number $\rho_{NUM}$ by its modulus, phasor $e^{j\hat{\phi}_c}$ (input to block 8 FIG. 3) is obtained. By dividing $\rho_{NUM}$ by $\rho_{DEN}$ (block 18) and extracting its modulus through the quadratic modulus extractor 13 and square root extractor 17, an estimate of the correlation coefficient $\rho$ is finally obtained. The whole device is obtained through the following family of components:

Block 11, which transforms a complex number into its conjugate,
Complex multipliers 12 implementable as in FIG. 2,
Quadratic modulus extractors 13,
N input adders 14,
Divide by a constant N 15,
Subtractors 16,
Square root extractors 17,
Dividers 18,
Coherent limiters 19,
Real multiplier 20.

MEMORY 5 (ref. to FIG. 3)

Within this memory we can find $N\rho$ areas, each one of which contains the elements of the covariance matrix of the disturbance for $f_c=0$.

Estimator 4 provides an estimated value $\hat{\rho}$ and the memory selector 5 addresses the area relevant to the value of $\rho$ which is closest to the one provided by the estimator. The numbers stored in the area selected are then dumped into a buffer 6 for further insertion into block 8.

Figure 5:
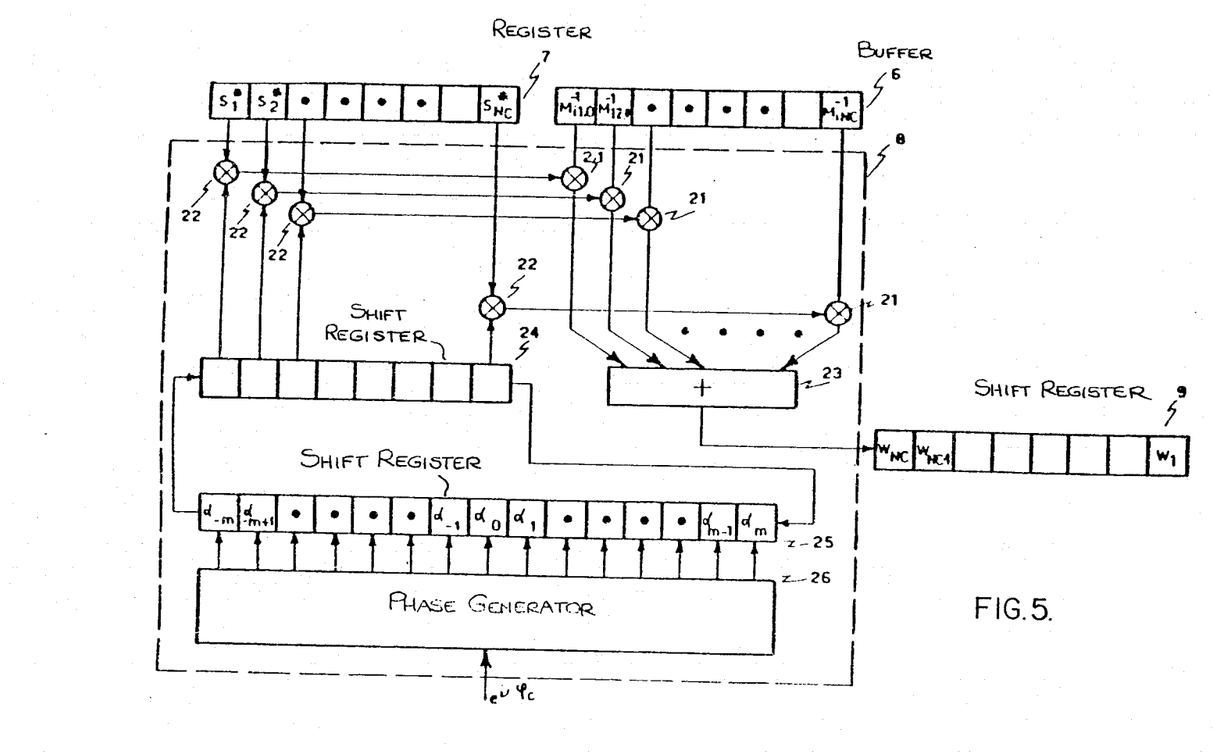
FIG. 5, in particular, shows the weight synthesizer or shaper (block 8 of FIG. 3)

BLOCK 8 (ref. to FIGS. 3, 5)

FIG. 5 shows in greater detail the device which calculates $\underline{W}$ coefficients by implementing equations (5) and (10). From (5) we have infact:

$$W_i = \sum_{K=1}^{N_c} M_{i,k}^{-1} S_K^* \quad (17)$$

and from (10)

$$M_{i,k}^{-1} = M_{i,k,o}^{-1} \alpha_{(i-k)} \quad (18)$$

$$\alpha_{(i-k)} = e^{j(i-k)\phi_c} \quad (19)$$

where

From buffer 6, we can extract line by line of matrix $\underline{M}^{-1}(\hat{\rho},0)$; the line elements are multiplied by:

Complex multipliers 21 times elements $S^*$ ($K-1, \ldots N_C$) contained in register 7 and times coefficients ($h = -m \ldots, 0, \ldots m$), with $h = i-k$ through complex multipliers 22. In this manner coefficient $W_i$ of (17) can be obtained from adder 23. This $W_i$ is then loaded into a shift register 9 so that after $N_C$ loadings the register contains all $N_C$ desired coefficients. Coefficients $\alpha_h$ are stored in a shift register 24 and the loading of the register is through a further shift register 25 which is initially set by the phase generator 26. For each line selected, i.e. for each $W_i$ coefficient calculated, a shift of one position in register 25 takes place with consequential shift into register 24.

Phase generator 26 is used to precalculate coefficients (19) starting from input $e^{j\phi_c}$ coming from estimator 4.

Figure 6:
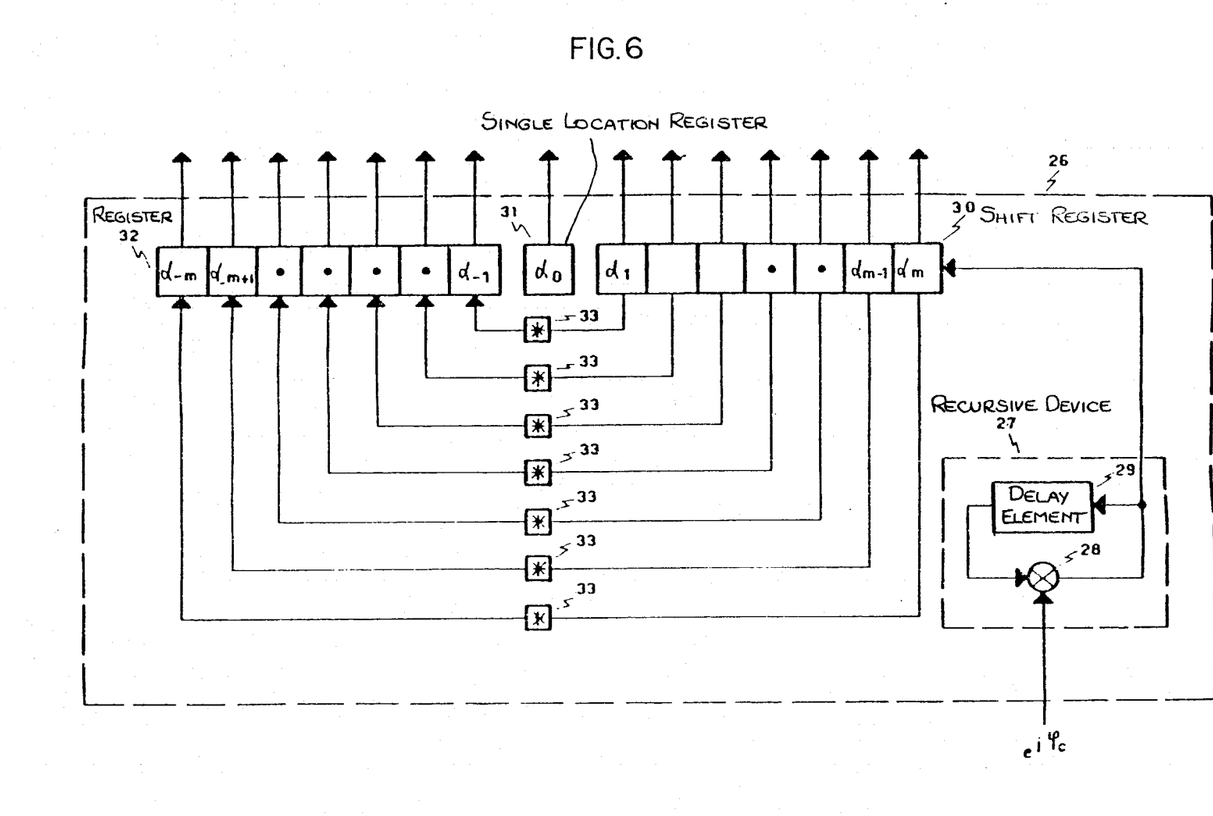
FIG. 6 shows in particular the phase generator (block 26 in FIG. 5).

FIG. 6 shows the functional schematic of this generator it is based upon the recursive relation:

$$\alpha_{h+1} = \alpha_h \cdot \alpha_1$$

$$h = 0, 1, 2, \ldots m \quad (20)$$

where
$$m = N_C - 1$$

$$\alpha_o = 1$$

$$\alpha_1 = e^{j\phi_c} \quad (21)$$

Coefficients $\alpha_1, \alpha_2, \alpha_3 \ldots \alpha_m$ are calculated through the recursive device 27 which synthesises equation (20) through multiplier 28 and delay element 29, by loading a shift register 30, which after m iterations will be completely full. Single location register 31 contains unit coefficient $\alpha_o$, while register 32 is loaded with the complex conjugate of register 30 elements (an operation which is carried out by devices 33).

Figure 7:
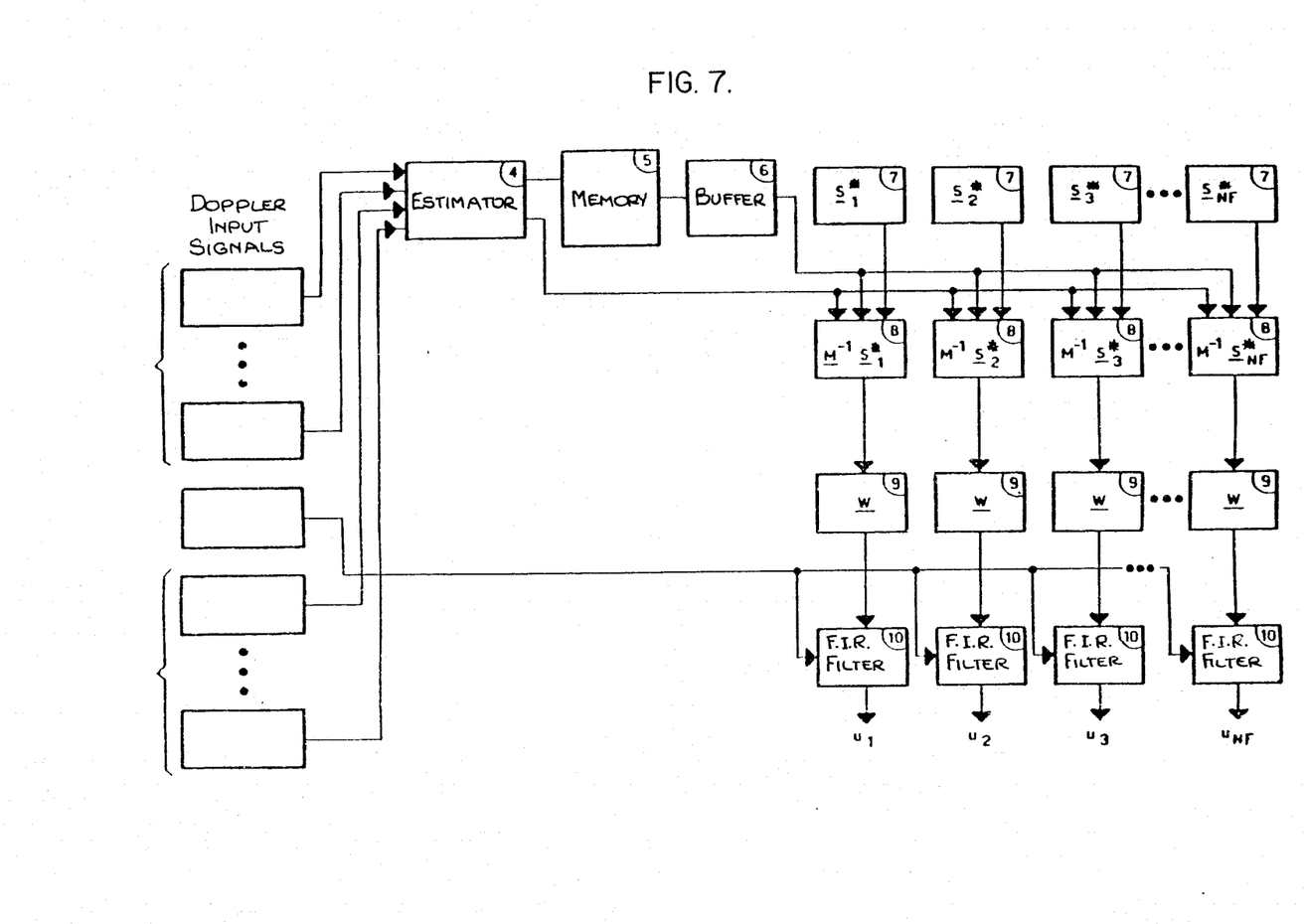
FIG. 7 shows a bank of Doppler filters which are obtained by a parallel of NF parametric suppressors, each of which is tuned to a given frequency of the useful signal.

The suppressor which is presented herein may also be used in a Doppler filter bank to cover the range of unambiguous Doppler frequencies, so as to detect useful signals f unknown Doppler frequency.

In such manner, $N_F$ FIR filters 10 will have to be catered for and a same number of registers 7 and 8 with related blocks 8 to calculate coefficients. FIG. 7 shows such configuration.

We claim:
1. A radar signal digital processor which suppresses clutter disturbances and enhances useful signals of given Doppler frequency, comprising:
   a finite impulse response filter (10);
   an estimator of disturbance parameters (4);
   a memory (5) coupled to an output of the estimator (4);
   a weight synthesizer (8) coupled to a second output of the estimator (4) for calculating complex weights; and
   a register (9) for storing the complex weights for output to the finite impulse response filter (10).
2. The radar signal digital processor of claim 1 wherein the estimator (4) comprises:
   at least one complex multiplier (12);
   at least one complex adder (14);
   at least one modulus extractor (15);
   a coherent limiter (19);
   a divider (18);
   at least two dividers by N (15);
   at least two multipliers (20)
   at least two adders (16)
   at least one square root extractor (17);
   means for selecting one of the areas of memory (5) which contains the inverse of the disturbance covariance matrix having zero Doppler; and
   means for providing disturbance Doppler phase to weight synthesizer (8) for the calculation of the complex weights.
3. The radar signal digital processor of claim 2 in which weight synthesizer (8) comprises:
   two registers (6) and (7);
   at least two complex multipliers (21) and (22); three shift registers (9), (24), (25); and
   a phase generator (26) comprising a shift register (30), two registers (31) and (32), at least two complex conjugate extractors, a delay line (29) and a complex multiplier (28).

* * * * *